United States Patent [19]
Korotenko et al.

[11] 3,831,049
[45] Aug. 20, 1974

[54] METHOD AND APPARATUS FOR REDUCING LOSSES IN TRANSMISSION SYSTEMS EMPLOYING ELECTRIC UNIPOLAR MACHINES WITH LIQUID-METAL CONTACTS

[76] Inventors: Boris Evdokimovich Korotenko, Armyansky pereulok, 1/3, kv. 15; Vitaly Borisovich Korotenko, Armyansky pereulok, 1/3, kv. 15; Paval Korneevich Shtepa, Pushinskaya ulitsa, 54, kv. 177, all of Kharkov, U.S.S.R.

[22] Filed: Apr. 6, 1972

[21] Appl. No.: 241,675

[52] U.S. Cl.............. 310/178, 310/113, 310/115
[51] Int. Cl. ............................................. H02k 31/00
[58] Field of Search .......... 310/113, 112, 114, 115, 310/178, 84, 219, 208, 243, 102

[56] References Cited
UNITED STATES PATENTS

| | | | |
|---|---|---|---|
| 2,979,630 | 4/1961 | Bishop | 310/178 |
| 3,133,216 | 5/1964 | Sayers | 310/178 |
| 3,163,792 | 12/1964 | Sayers | 310/178 |
| 3,295,091 | 12/1966 | Von Mossin | 310/219 |
| 3,513,340 | 5/1970 | Appleton | 310/113 |
| 3,585,398 | 6/1971 | Harvey | 310/178 |

*Primary Examiner*—R. Skudy
*Attorney, Agent, or Firm*—Holman & Stern

[57] ABSTRACT

A method of reducing losses in electric unipolar transmissions is disclosed, the transmission having at least one first and one second coaxially interconnected unipolar electric machines each having at least two working current conductors. One of the current carrying conductors of the first machine is rotated jointly with one of the current carrying conductors of the second machine at the same speed and in the same direction, while the other working current conductor of the first machine is rotated in the same direction but at an increased speed. The other working conductor of the second machine rotates under the action of the magnetic fields set up during operation of the transmission system. An apparatus for carrying out the above method is also disclosed.

7 Claims, 3 Drawing Figures

METHOD AND APPARATUS FOR REDUCING LOSSES IN TRANSMISSION SYSTEMS EMPLOYING ELECTRIC UNIPOLAR MACHINES WITH LIQUID-METAL CONTACTS

BACKGROUND OF THE INVENTION

The present invention relates to electric drive techniques, employing a generator - motor system for stepless adjustment of the speed of rotation within a wide range, and, more particularly, it relates to a method of reducing losses in electric unipolar transmissions and to electric unipolar transmissions employing this method.

The invention can be employed in machinery, where it is essential to have a compact unit adapted to effect stepless adjustment of the transmission ratio between a pair of shafts under a working load. For instance, the invention cam be employed in motor vehicles, such as cars, trucks, tractors, diesel locomotives, in earth-moving and road-building machines, in metal-working machine tools, rolling mills and other transport and production machinery.

From a multitude of known devices offering adjustment of the transmission ratio between a pair of shafts an electric transmission is the one most easily controlled, since it is capable of effecting automatic adjustment of the transmission ratio between a prime mover and a work-performing member in accordance with varying operating conditions of the machine in question. Therefore, the electric transmission has found a broad field of applications in machines where the power transmitted is as large as hundreds and even thousands of kilowatts.

However, the overall dimensions, the weight and the cost of the electric machines making up such a transmission place a practical limit on the possibility of its employment in less powerful drive systems, such as those of cars, trucks and lorries, in which nowadays are usually incorporated multi-step gear boxes and transmissions that are cumbersome both in cases of manual and automatic control.

The electric transmissions are usually a combination of a pair of dynamoelectric machines, usually of the slip-ring, direct-current kind, connected into a generator - motor system. In order to vary the transmission ratio between the first machine rotated by the prime mover and the second machine imparting rotation to the work-performing member, it is the common practice to control first the excitation current of the first machine, and then the excitation current of the second machine.

However, the slip-ring direct current machines, in addition to their relatively great weight and dimensions, usually have a rapidly wearing commutation assembly operating under trying conditions, due to the necessity of controlling the magnetic flux of the machine with relatively large values of electric current flowing through the armature circuit.

The employment in generator - motor systems of more compact, more reliable and less expensive alternatingcurrent machines involves the incorporation of complicated and costly frequency converters which more often than not do not ensure a sinusoidal shape of the voltage curve within a broad range of frequencies, the curve being rich in harmknic co-pknents that adversely affect the operation of the motors.

It has already been suggested that unipolar electric machines with liquid metal contacts be employed in electric transmissions of the kind referred to.

In principle, unipolar electric machines are superior to all the other tant characteristics as the dimensions, the weight, the process of manufacture and the manufacture costs, the overload characteristics and the controllability are concerned, which facts together with the low value of the output moment of inertia greatly simplify the problem of automatic control.

These electronic unipolar machines are devoid of the slip-ring commutation assembly of the kind employed in direct-current machines; neither do they require any apparatus of the frequency converter kind.

The inherent disadvantage of the electric unipolar machines i.e., their low operating voltage is of little significance in the unipolar transmissions, since in this case the two unipolar machines which are coaxially arranged as a unitary structure, with their output conductors facing each other, have extremely short working current conductors in the power circuit. The amount of non-ferrous metal in a unipolar machine being relatively small, the total amount of this non-ferrous metal in the entire unipolar electric transmission is but a fraction of that present in electric transmissions based on the incorporation of other types of electric machines.

The technique of controlling an electric unipolar transmission is identical that of controlling electrical transmissions incorporating slip-ring direct-current machines, i.e., the transmission is controlled by varying the excitation currents of the two unipolar machines making up the transmission.

However, the employment of compact transmission units have been hitherto impeded by the inadequate quality of the performance of liquid metal contacts, on account of relatively high electric and hydraulic losses therein, these losses limiting the useful torque and the speed capacity of unipolar machines. The electric losses are brought about by the high electric resistance of the liquid metal contact areas, which is substantially higher that the resistance of all the other working current conductors in the power circuit, whereas the hydraulic losses are brought about by the high turbulence of the liquid metal in the contact zones.

There are known structures of large unipolar machines (of capacities of about 10,000 kW), wherein, in order to reduce the electric and hydraulic losses, a magnetic field is applied to the contact zone. However, the eddy currents circulating between the contact surfaces of the contact rings are then apt to grow substantially, bringing about corresponding electric losses.

The possibility of reducing the electric resistance of the liquid metal contacts by increasing the width of the contact rings is limited by the consideration that such an increase results in the accompanying increase in hydraulic losses and losses brought about by the eddy currents, of which the value is proportional to the cube of the width of the ring.

Therefore, the problem of reducing electric and hydraulic losses in the liquid metal contacts of electric unipolar machines is of some importance.

Besides, an electric unipolar machine operated as a motor has a small starting torque, since with the contact rings being stationary, the distribution of the entire volume of the liquid metal throughout the whole circumference of the space between the cooperating rings is practically never attained.

SUMMARY OF THE INVENTION

It is an object of the present invention to considerably reduce the electric and hydraulic losses in the liquid metal contacts of unipolar electric machines connected into a generator - motor system and thus forming an electric unipolar transmission.

Since the losses are proportional to the cube of the relative speed of the rotation of the contact rings, the most effective way of reducing these losses in the liquid metal contacts is to reduce this relative speed. Consequently, it is an object of the present invention to reduce the relative speed of the rotation of the contact rings without reducing the speed of the machines of the electric unipolar transmission.

This object is attained by a method of reducing the losses in an electric unipolar transmission comprising two electric unipolar machines having liquid metal contacts, arranged coaxially and connected into a generator - motor system, each one of said two machines including two working current conductors, in which method, in accordance with the present invention, one of the two working current conductors of the first one of the two machines and one of the two working current conductors of the other one of the two machines are rotated jointly and positively at the same angular speed, while the other respective two working current conductors of the two machines are rotated in the same direction, the respective speeds of the rotation of the two working current conductors of the first machine being different.

It is advisable that in the electric unipolar transmission one of the working current conductors of the first machine should be mechanically connected with one of the working current conductors of the other machine of the electric unipolar transmission and should be further mechanically linked with the external drive means, so that the last-mentioned two working current conductors, connected to each other, should be capable of being rotated by the drive means independently of the rotation of the shafts connected with the other two working current conductors of the respective ones of the two unipolar electric machines.

In one preferred embodiment of the present invention the respective reactors of the two electric unipolar machines are connected to each other and linked to the external independent drive, while the armatures of the machines are connected with the shafts of the respective machines.

In another embodiment of the present invention the armatures of the two electric unipolar machines of the unipolar electric transmission are connected to each other.

Alternatively, the armature of one of the two machines may be connected to the reactor of the other machine.

It is advisable that the electric unipolar transmission constructed in accordance with the last-mentioned two embodiments of the present invention should include a casing transmitting rotation from the external drive means to the two working current conductors, connected to each other.

Owing to the fact in the herein disclosed unipolar electric transmission in each one of the two unipolar machines both working current conductors rotate in the same direction, the relative speed of their rotation is substantially lower than the absolute speed of this rotation, the slipping speed of the contact surfaces of the liquid metal contacts also becoming lower than that in unipolar transmissions having stationary conductors of the working current. This reduction of the slipping speed of the contact surfaces of the liquid metal contacts results in a sharp reduction of the electric and hydraulic losses therein. Thus, with the relative speed been reduced to one half, the losses in the liquid metal contacts become reduced to one eighth, and, therefore, it becomes possible to considerably reduce the overall dimensions of the electric unipolar transmission by stepping up its operational speed.

Moreover, with the electric unipolar transmission constructed in accordance with the present invention, all the contacts thereof are filled with the liquid metal at any mode of its operation, so that a relatively large starting torque applied to the output shaft of the transmission is ensured.

The slipping speed of all the surfaces of the liquid metal contacts, subject to wear, is reduced to nearly one half, whereby the service life of the electric unipolar transmission is prolonged.

With the external surface of the casing of the electric unipolar transmission rotating in operation, the heat transfer therefrom into the ambient atmosphere is greatly intensified, which also provides facilities for reducing the weight of the electric unipolar transmission and stepping up its efficiency factor.

Test trials have proved that the herein disclosed electric unipolar transmissions can be made into a transmission ratio adjusting mechanism characterized by fairly modest size and weight, and this mechanism can therefore be used in applications where the weight and size limitations are essential, e.g., in cars and trucks, diesel locomotives, earth-moving and road-building machines, etc.

BRIEF DESCRIPTION OF THE DRAWINGS

The present invention will be further described in connection with several embodiments thereof, with reference being had to the accompanying drawings, wherein.

DETAILED DESCRIPTION OF PREFERRED EMBODIMENTS

The herein disclosed unipolar transmissions each comprise a pair of coaxially arranged unipolar electric machines with liquid metal contacts, connected into a generator-motor system. Each one of the two machines of the transmission has two working current conducting structures, viz. an armature and a reactor.

Figure 1:
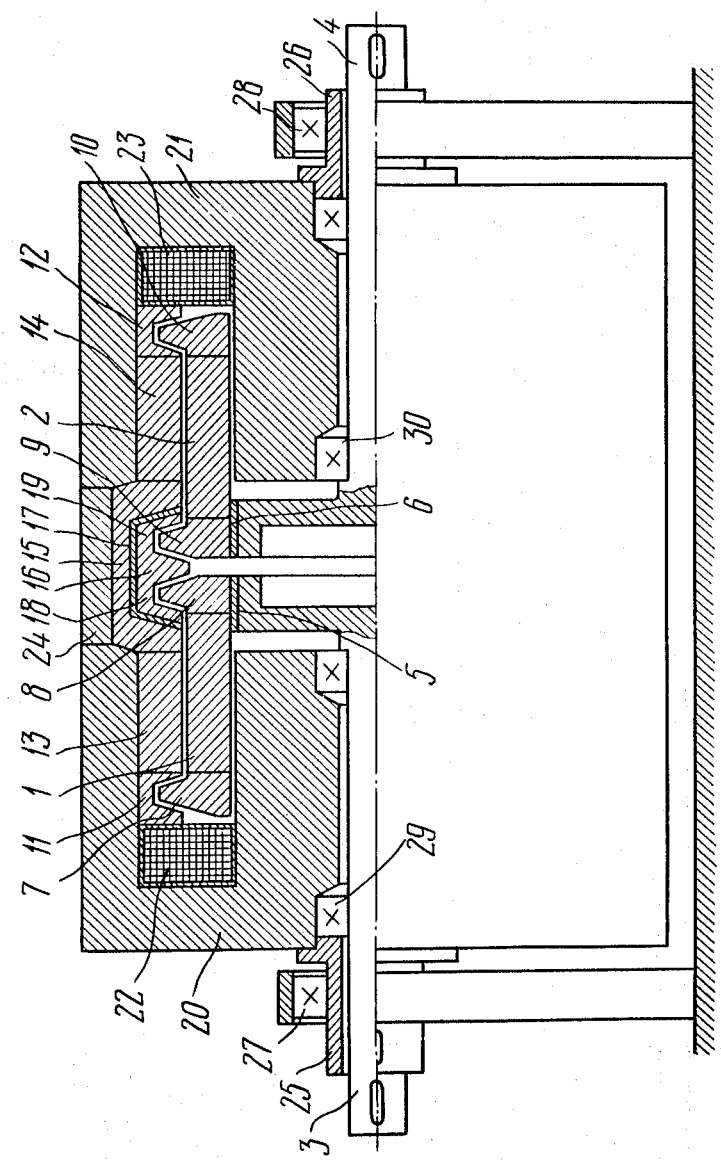
FIG. 1 illustrates the electric unipolar transmission with the two reactors mechanically linked together, c in accordance with the invention; 8

In the electric unipolar transmission, illustrated in FIG. 1, the armatures 1 and 2, respectively, of the first and second unipolar machines are rigidly connected to the respective input and output shafts of the first and second unipolar machines through insulating gaskets 5 and 6.

The armature 1 of the first unipolar machine has connected thereto a pair of internal contact rings 7 and 8, while the armature 2 of the second unipolar machine has connected thereto a pair of internal contact rings 9 and 10. The external contact rings 11 receiving thereinside the internal contact rings 7 and 10, respectively, are formed in the reactors 13 and 14 of the first and second unipolar machines. The reactors 13 and 14 are in the form of hollow cylinders, preferably made of a ferromagnetic material, arranged coaxially with the armatures 1 and 2, are are interconnected by an external electrically conductive cylinder 15. The latter receives thereinside an internal electrically conductive cylinder 16 insulated from the cylinder 15 by an insulating gasket 17. The internal surface of the cylinder 16 has annular grooves made therein serving as the external contact rings 18 and 19 receiving therein the internal contact rings 8 and 9. Thus, all the external contact rings are connected electrically in pairs: the rings 11 and 12 are electrically connected through the external conductive cylinder 15; the rings 18 and 19 are connected through the internal conductive cylinder 16. Furthermore, all the external contact rings 11, 12, 16 and 19 are mechanically interconnected by the rigid connection between the reactors 13 and 14. The latter two are mounted in and attached to the magnetic cores 20 and 21, respectively, of the first and of the second unipolar machines, the cores also having mounted therein the respective excitation windings 22 and 23. The magnetic cores 20 and 21, respectively, of the first and second unipolar machines are connected to each other by a diamagnetic cylinder 24 and have mounted thereon sleeves 25 and 26 journalled in the bearings 27 and 28 coaxially with the input and output shafts 3 and 4, respectively. The sleeve 25 of the core 20 of the first unipolar machine is intended for mechanical connection thereof with the external drive structure, independently of the shafts 3 and 4 connected with the respective armatures 1 and 2 and journalled in bearings 29 and 30 of which the external races are preferably attached to the magnetic cores 20 and 21, respectively. In this way there is ensured simultaneous joint rotation of all the external contact rings 11, 12, 18 and 19 of the two unipolar electric machines, whereby the zone of electric contact is filled with the liquid metal throughout any operational duty of the herein disclosed unipolar electric transmission.

The embodiment of the electric unipolar transmission, illustrated in FIG. 1, is driven by an external drive system imparting rotation simultaneously to the shaft 3 and to the sleeve 25, the latter rotating in the same direction, as does the shaft 3, but at a lower angular speed.

Mechanically connected with the sleeve 25 and rotating jointly therewith are the two working current conductors, one from each one of the two electric unipolar machines. In the embodiment of the electric unipolar transmission, illustrated in FIG. I, the two conductors are the reactors 13 and 14.

Consequently, when the sleeve 25 and the input shaft 3 are rotating simultaneously, in each one of the zones of liquid metal contact at least one of the respective rings 7, 8, 10, 11, 18 and 19 is rotating, whereby in every zone of liquid metal contact of the herein disclosed electric unipolar transmission the entire circumference of the contact area is filled with the liquid metal, even if the output shaft 4 of the electric unipolar transmission is immobile. In this way it is possible to ensure that a relatively high starting torque is applied to the output shaft 4 of the unipolar transmission.

Since input shaft 3 and the sleeve 25 is rotated by the external drive system at different angular speeds, then is present relative rotational speed between the working current conductors of the first electric machine, i.e., between the reactor 13 and the armature 1, whereby this machine has generated therein an electromotive force which can be calculated by the known expression:

$$e_1 = c_1 \ \phi_1(n_1 - n_o),$$

where $e_1$ is the value of the EMF of the first unipolar machine;

$c_1$ is the structural constant of this machine;

$\phi_1$ is the magnetic flux of this machine;

$n_1$ is the angular speed of the shaft 3 with which one of the working current conductors of the first machine is connected (in the herein disclosed embodiment this conductor is the armature 1);

$n_o$ is the angular speed of the sleeve 25 rotating jointly with the second working current conductor of the first machine (here - the reactor 13), All the working current conductors of the herein disclosed electric unipolar transmission are connected by the liquid metal contact zones into a single common electric circuit, or ring, and the value of the electromotive force $e_2$ of the second machine is practically equal to the value of the electromotive force $e_1$ of the first machine and is directed in opposition thereto, i.e. $e_1 = -e_2$.

The value of the electromotive force $e_2$ of the second machine is calculated by the same expression, as the value of the electromotive force $e_1$ of the first machine, viz.:

$$e_2 = c_2 \ \phi_2(n_2 - n_o)$$

where $c_2$ is the structural constant of the second machine;

$\phi_2$ is the magnetic flux of this machine;

$n_2$ is the angular speed of the output shaft 4 of the electric unipolar transmission, rigidly connected with one of the working current conductors of the second machine (here - with the armature 2 of the second machine).

As it has been already mentioned, the external drive system imparts rotation to the input shaft 3 and to the sleeve 25 at different angular speeds. Let us express the ratio of the angular speeds imparted by the external drive system to the sleeve 25 and to the shaft 3, as $i_o$, i.e., $$i_o = n_o/n_1.$$

Let us further express the ratio of the respective structural constants of the second and first machines, as $k$, i.e., $$k = c_2/c_1$$

Let us also express the ratio of the angular speeds of the input shaft 3 and the output shaft 4 of the electric unipolar transmission, i.e. the transmission ratio controlled by this transmission, as $i$. Then $$i = n_2/n_1$$

Now, re-arranging the above expressions and subjecting them to simple algebraic operations, the following equation is obtained:

$$i = i_o - \phi_1/\phi_2 (1 - i_o)/k$$

It can be seen from this equation that by selecting an appropriate value of the ratio $i_o$ of the angular speeds of the shaft 3 and of the sleeve 25 and by effecting this ratio in the external drive system of the herein disclosed transmission, and also by varying the ratio of the respective structural constants of the two unipolar machines, i.e., the value $k$, it becomes possible to attain a desired range of stepless adjustment of the transmission ratio between the speeds of the input and output shafts 3 and 4, respectively, of the herein disclosed unipolar transmission, by controlling the respective magnetic fluxes of the two machines making up the transmission.

EXAMPLE

Let us presume that the two electric machines of the herein disclosed unipolar transmission are identical, and thus k equals 1. The external drive system rotates the sleeve 25 at a speed that is one half of the speed imparted to the input shaft 3, i.e., $i_o$ equals 1/2. Then the above equation attains the following form:

$$i = 1/2 (1 - \phi_1/\phi_2)$$

From the above form of the equation it can be seen that even if the value of the magnetic flux of the second machine is permanent, i.e., $\phi_2 = \phi_{max} = $ const., it is possible, by controlling solely the magnetic flux of the first machine, to have the herein disclosed transmission adjusting the transmission ratio between the speeds of the input shaft 3 and of the output shaft 4 within a range from 0:1 to 1:1. Should it be necessary to broaden this range of adjustment, the magnetic flux $\phi_2$ of the second machine is controlled, also.

Figure 2:
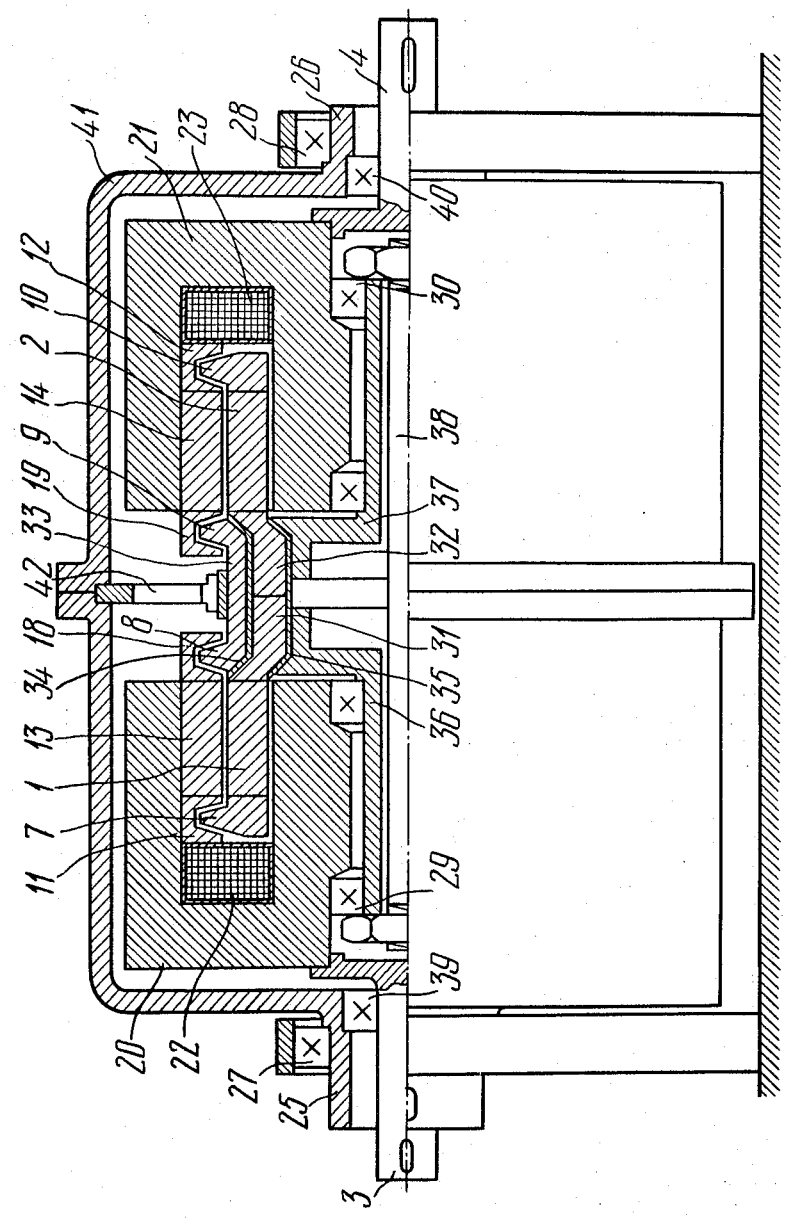
FIG. 2 illustrates the electric unipolar transmission with the two armatures linked mechanically together, in accordance with another embodiment of the invention.

In the electric unipolar transmission illustrated in FIG. 2 the armatures 1 and 2, respectively, of the two machines are interconnected by an internal electrically conductive cylinder made up by two parts 31 and 32, and are provided, respectively, with the internal contact rings 7 and 10. The internal contact rings 8 and 9 are made in the end face of another electrically conductive cylinder 33 rigidly connected through an electrically insulating gasket 34 with the two parts 31 and 32 of the internal electrically conductive cylinder. The latter is rigidly connected through an insulating gasket 35 with two half-axles 36 and 37 receiving thereinside a fastener 38 bracing the above-mentioned parts together into a unitary assembly. The half-axles 36 and 37 are journalled in bearings 29 and 30 of which the external races are mounted in the magnetic core structures 20 and 21, fast with the input shaft 3 and with the output shaft 4, respectively. The two shafts 3 and 4 are journalled in bearings 39 and 40, while the sleeves 25 and 26 are journalled in bearings 27 and 28, respectively, coaxially with the shafts 3 and 4, the sleeves being fast with the casing 41 of the herein disclosed transmission. The casing 41 is connected through an interposer 42 with the electrically conductive cylinder 33 and thus establishes mechanical connection of the two armatures 1 and 2, respectively, of the two machines with the external drive system through the sleeve 25, independently of the shafts 3 and 4, which latter are connected with the magnetic core structures 20 and 21. The magnetic core structures 20 and 21 have mounted therein and connected thereto the reactors 13 and 14 and the excitation windings 22 and 23. The reactors 13 and 14 have made therein all the external contact rings 11, 12, 18 and 19 receiving therein the internal contact rings 7, 10, 8 and 9, respectively. The latter are electrically connected in pairs: the rings 7 and 10 are connected through the armatures 1 and 2 and through the internal electrically conductive cylinder made up by the two parts 31 and 32 and interconnecting these armatures; the rings 8 and 9 are connected electrically through the electrically conductive cylinder 33.

With the armatures 1 and 2 of the two machines being mechanically connected with each other and being further connected to the external drive through the casing 41 and the sleeve 25, the armatures can rotate jointly in the same direction, as does the shaft 3, but at a slower speed.

The difference between the presently described embodiment of the electric unipolar transmission illustrated in FIG. 2, and the one illustrated in FIG. 1 and described hereinabove is in that here the respective armatures 1 and 2 of the two machines are mechanically linked and rotate jointly at the same speed, while the input shaft imparts rotation to the reactor 13 through the magnetic core structure 20, the output shaft 4 being fast with the magnetic core structure 21 and thus receiving the driving torque from the reactor 14.

Considering the electric unipolar transmission illustrated in FIG. 2, with the transmission illustrated in FIG. 1:

two working current conductors, one in each machine, are mechanically connected and are jointly rotated by the external drive;

the respective working current conductors of the two machines, that are not mechanically linked, are connected, respectively, with the input shaft and with the output shaft of the transmission;

all the abovementioned working current conductors of the two machines are electrically connected with the help of the liquid metal contacts into one common electric current ring, it can be seen that all the above considerations and calculations pertaining to the embodiment illustrated in FIG. 1 are also true in respect of the embodiment of the electric unipolar transmission, illustrated in FIG. 2.

Figure 3:
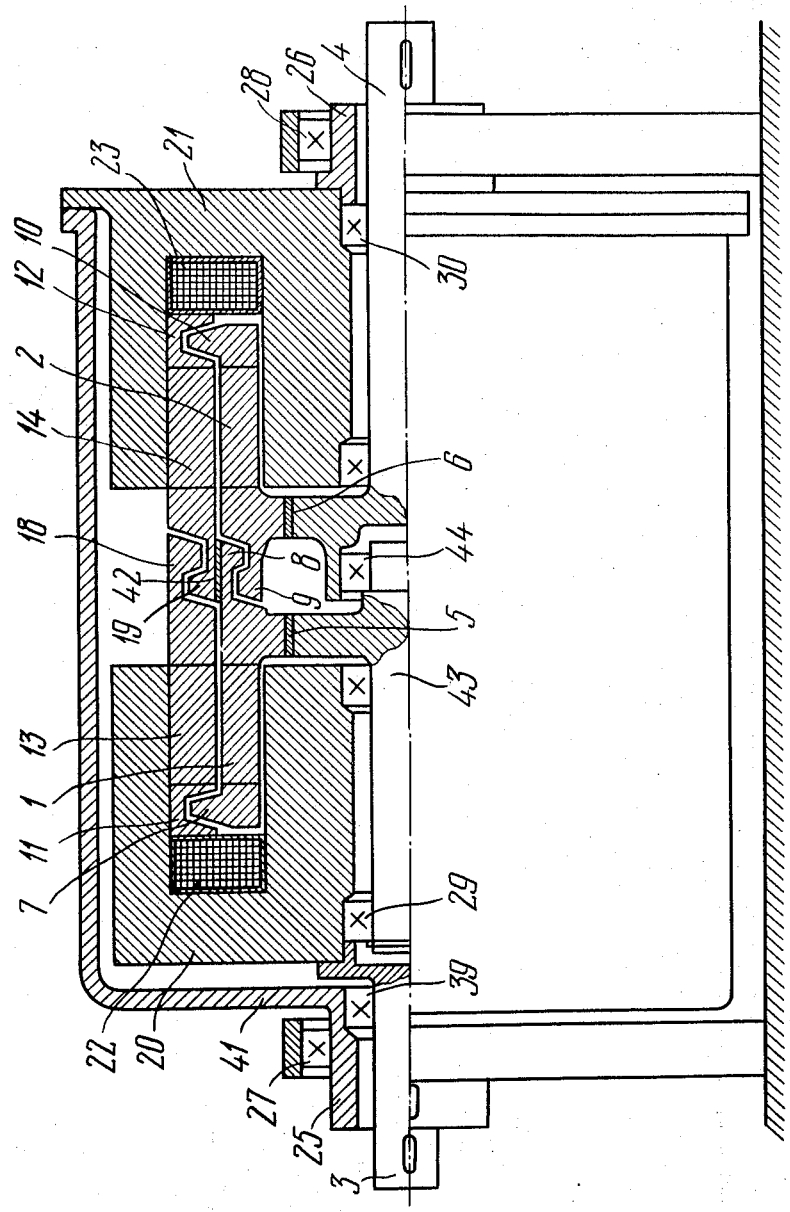
FIG. 3 illustrates the electric unipolar transmission, wherein the armature of one of the two unipolar machines is mechanically linked with the reactor of the other one of the two unipolar machines, in accordance with yet another embodiment of the invention.

The embodiment of the electric unipolar transmission, illustrated in FIG. 3, has the following structure. The two electirc unipolar machines, like those in the embodiment illustrated in FIG. 2, are enclosed within a casing 41 which also has on the side of the input shaft 3 a sleeve 25 journalled in the bearing 27, coaxially with the lastmentioned shaft, the latter being fast with the magnetic core structure 20 of the first unipolar machine and being journalled in the bearing 39. On the opposite side the casing 41 is rigidly connected to the magnetic core structure of the second unipolar machine, e.g., with the help of a flange connection. The last-mentioned magnetic core structure, in its turn, is connected with a sleeve 26 journalled in the bearing 28, coaxially with the output shaft 4. The magnetic core structures 20 and 21 have mounted therein and are mechanically connected with the reactors 13 and 14 and the excitation windings 22 and 23.

The reactors 13 and 14 are associated with the contact rings 11, 12, 18 and 19, whereas the armatures 1 and 2 are associated with the contact rings 7, 8, 9 and 10.

The reactor 14 of the second machine is mechanically connected for joint rotation with the armature 1 of the first machine, e.g., through an intermediate part 42 which may be in the form of a toothed washer, the armature 1 being connected through an electrically insulating gasket 5 with an intermediate shaft 43 journalled in bearings 29 and 44. The armature 2 of the second machine is connected with the output shaft 4 through an electrically insulating gasket 6. The output shaft 4 is journalled in bearings 30; the external races of the bearings 29 and 30 are preferably fast with the magnetic core structures 20 and 21, respectively.

Unlike the two previously described embodiments, the presently described embodiment of the electric unipolar transmission, illustrated in FIG. 3, has the armature 1 of the first machine and the reactor 14 and the magnetic core structure 21 of the second machine rigidly connected to one another for joint rotation from the external drive through the sleeve 25; the input shaft 3 of this embodiment of the electric unipola transmission is rigidly connected through the magnetic core structure 20 with the reactor 13 of the first machine. The output shaft 4 is fast with the armature 2 of the second machine and is rotated thereby.

However, the above specific features of the embodiment illustrated in FIG. 3 do not interfere with the correctness of the expressions and calculations that have been disclosed hereinabove in connection with the description of the operation and the method of adjustment of the embodiment of the electric unipolar transmission, illustrated in FIG. I. Therefore, these calculations and expressions are just as true in respect of the operation and the mode of adjustment of the embodiment of the electric unipolar transmission, illustrated in FIG. 3.

With the internal and external contact rings of all the abovedescribed embodiments of the herein disclosed electric unipolar transmission rotating in the same direction, the relative speed of the rings rotating together with the shaft of the machine is substantially lower than the absolute speed of the rotation thereof. Therefore, the hydraulic losses in the contact areas, which are proportional to the cube of the relative contact speed of the rotation, are considerably reduced. Thus, for instance, when the two interconnected conductors of the two machines are rotated at a speed that is one half of the speed of the driving shaft, the hydraulic losses become reduced to but one eighth and even less. Furthermore, in the herein disclosed electric unipolar transmission the entire volume of the liquid metal within the contact zones is subjected to the action of centrifugal forces, whereby the metal display practically no emulsification, and therefore, its volumateric electric resistance is low, and the metal would not be driven from the contact zone along the walls of a stationary contact ring; consequently, the electric losses on account of the resistance of the contact areas are but small.

What we claim is:

1. An electric unipolar transmission system comprising:
    at least one first and one second coaxially arranged electric unipolar machines with liquid-metal contacts and means for connecting said machines into a generator-motor system, each of said machines having a power circuit means consisting of at least two working current conductors electrically interconnected by means of liquid metal contacts and an associated working current and electromagnetic field generated during operation of the system;
    means for mechanically connecting one of said working current conductors of said first unipolar machine with one of the working current conductors of said second unipolar machine;
    drive means for rotating said mechanically connected working conductors;
    a first shaft means connected to the other one of said working current conductors of said first unipolar machine, said drive means also causing said other one of said working current conductors to rotate in the same direction as said one of said working current conductors of said first unipolar machines but at a higher speed;
    a second shaft means connected to the ohter one of said working current conductors of said second unipolar machine, said other one of said working current conductors rotating during operation of the system at a speed determined by variation in the magnetic field of said second unipolar machine.

2. An electric unipolar transmission according to claim 1, wherein said working current conductors of said electric unipolar machines consist of armatures and reactors.

3. An electric unipolar transmission according to claim 2, wherein said mechanically connected current conductors of said electric unipolar machines, are reactors.

4. An electric unipolar transmission according to claim 2, wherein said mechanically connected current conductors of said electric unipolar machines, are armatures.

5. An electric unipolar transmission according to claim 2, wherein said mechanically connected current conductors of said electric unipolar machines, connected to, are the armature of said first machine and the reactor of said second machine.

6. An electric unipolar transmission according to claim 2, wherein said transmission system is enclosed within a casing means which transmits rotation from said drive means to said mechanically connected current conductors of said electric machines.

7. A method for reducing losses in liquid-metal contacts of electric unipolar transmission systems having at leat a first and second unipolar machine arranged coaxially and connected into a generator-motor system, each machine including in the power circuit thereof two working current conductors electrically interconnected by means of liquid metal contacts and having an associated working current and electromagnetic field generated during operation of the system, the method including the steps of:
    rotating one of said working conductors of said first machine and one of said working current conductors of said second machine, in the same direction and at the same speed;
    rotating the other one of said working current conductors of said first machine in the same direction as said one of said working conductors of said first machine and said second machine respectively but at a higher speed, while the other working conductor of said second machine rotates under the action of said associated working current and electromagnetic field.

* * * * *